No. 706,940. Patented Aug. 12, 1902.
W. R. HERRING.
MECHANISM FOR MEASURING COAL TO GAS RETORTS.
(Application filed Nov. 4, 1901.)
(No Model.) 5 Sheets—Sheet 3.

Figure 3:
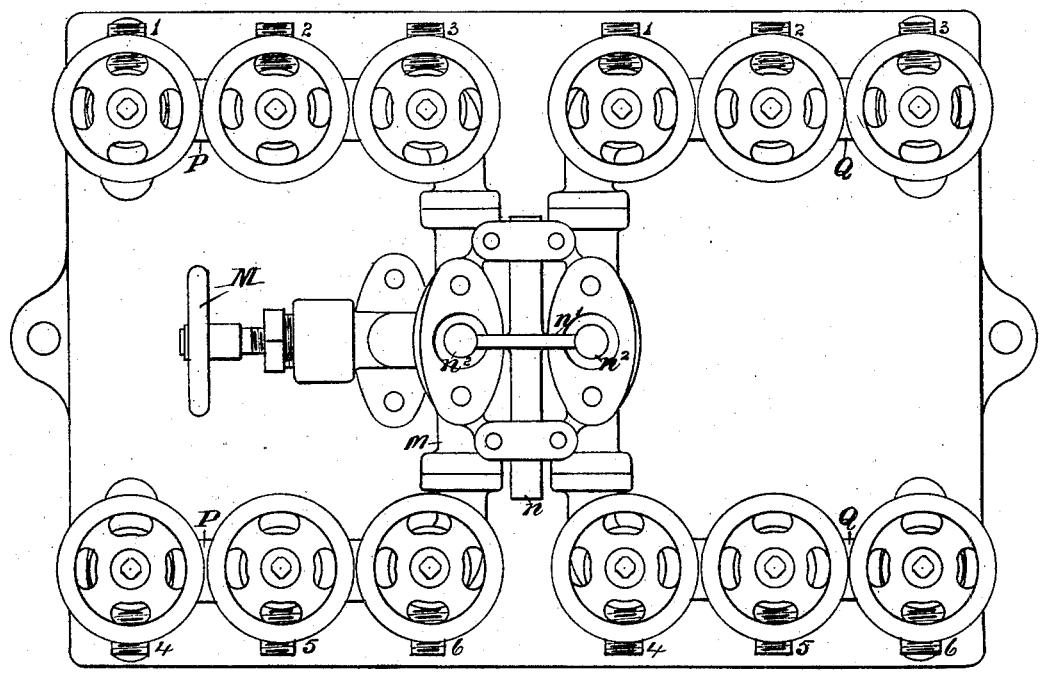

No. 706,940. Patented Aug. 12, 1902.
W. R. HERRING.
MECHANISM FOR MEASURING COAL TO GAS RETORTS.
(Application filed Nov. 4, 1901.)
(No Model.)
5 Sheets—Sheet 4.
Fig. 3ª
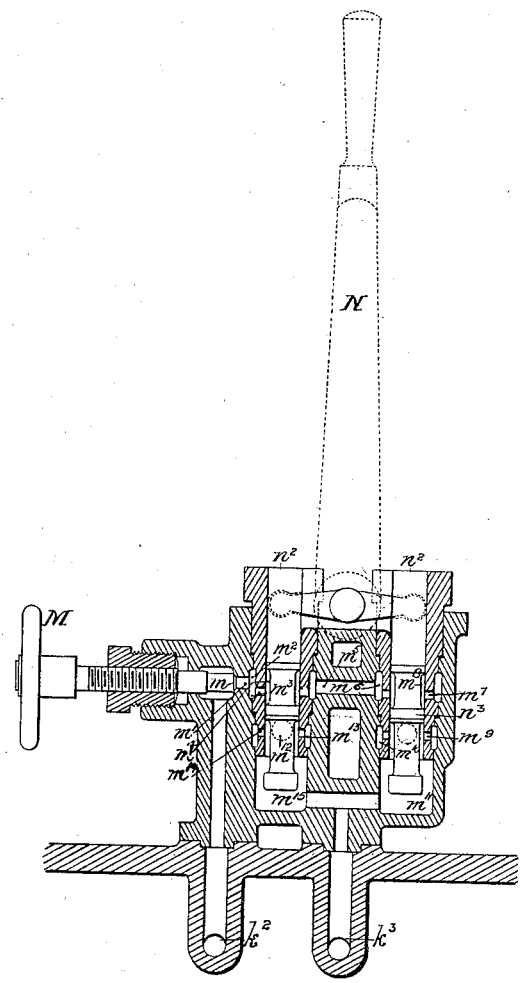

No. 706,940. Patented Aug. 12, 1902.
W. R. HERRING.
MECHANISM FOR MEASURING COAL TO GAS RETORTS.
(Application filed Nov. 4, 1901.)

(No Model.) 5 Sheets—Sheet 5.

Witnesses
J. Green
O. F. Sonnick

Inventor
Walter R. Herring
by Knight Bros
attys

UNITED STATES PATENT OFFICE.

WALTER RALPH HERRING, OF EDINBURGH, SCOTLAND.

MECHANISM FOR MEASURING COAL TO GAS-RETORTS.

SPECIFICATION forming part of Letters Patent No. 706,940, dated August 12, 1902.

Application filed November 4, 1901. Serial No. 81,068. (No model.)

*To all whom it may concern:*

Be it known that I, WALTER RALPH HERRING, chief engineer and manager to the Edinburgh and Leith Gas Commissioners, a subject of the King of the United Kingdom of Great Britain and Ireland, and a resident of New Street Works, Edinburgh, in the county of Mid-Lothian, Scotland, have invented Improvements in Mechanism for Feeding Coal from Storage-Hoppers to Gas-Retorts, of which the following is a specification.

This invention relates to improvements in the method of manipulating the slide-valves of coal-storage hoppers or measuring-chambers in connection with inclined gas-retorts, gas-producers, and for other similar purposes; and it consists in the application of hydraulic or other power to the working of the slides instead of manipulating them by hand-power through compound and other levers, involving as they do considerable physical labor and a greater expense in construction.

Figure 1:
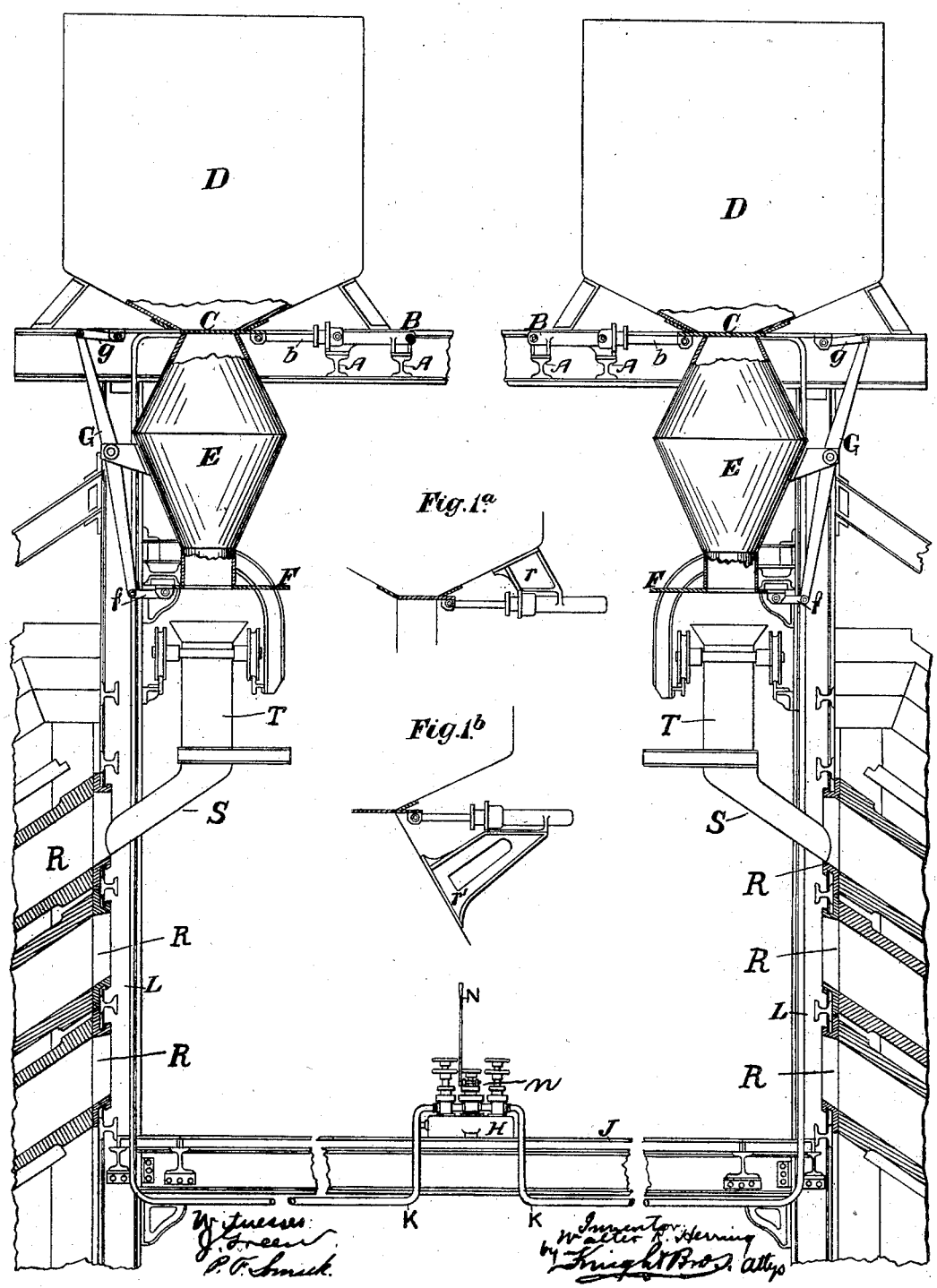
Figure 2:
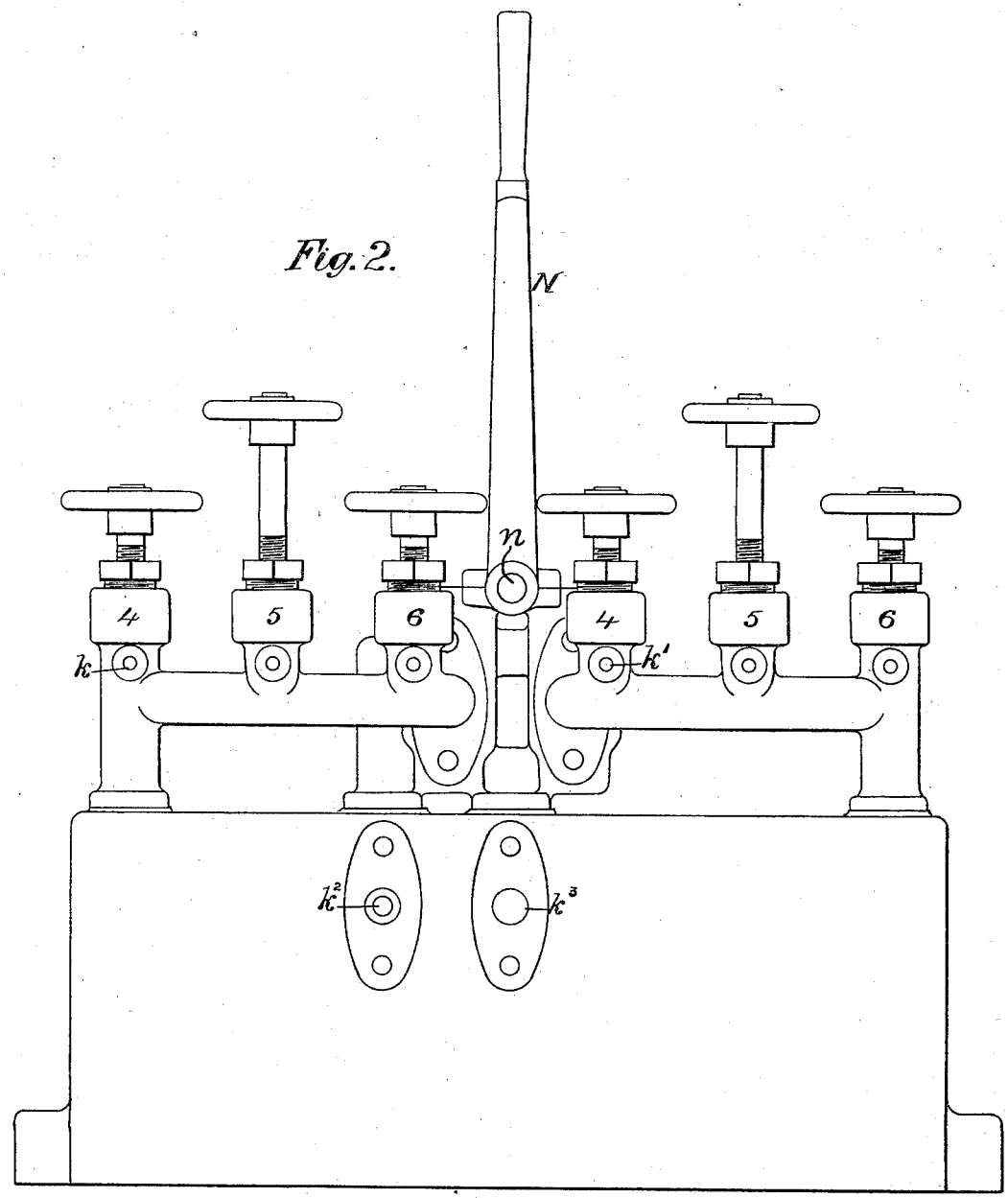

Figure 1 is a sectional side elevation of a double setting of retorts, showing my improvements applied to the base of the coal-storing hoppers and the manipulation of the top and bottom slide-valves of the coal-measuring chambers suspended beneath. Figs. 1$^a$ and 1$^b$ are modifications hereinafter referred to. Figs. 2 and 3 are enlarged detail views of the valves for transmitting power to the double-acting hydraulic cylinders, which are made to operate the slides in the manner shown, a pipe supplying the pressure at either end of each cylinder, acting alternately as pressure and exhaust, the handle N being removed in Fig. 3. Fig. 3$^a$ is a vertical longitudinal section taken through the center of Fig. 3 to show the construction of the operating-valves hereinafter described. Figs. 4 to 7 are modifications hereinafter referred to.

I have indicated the ends of inclined retorts R, chutes S, and traveling hoppers T. These parts may be constructed and arranged in any usual and suitable manner.

Mounted on the girders A are the hydraulic cylinders B, the piston-rods $b$ of which are attached to the slides C, which run between guides immediately below the coal-hoppers D, from which the measuring-chambers E are suspended, the closing of the slide C simultaneously effecting the opening of the lower slide F through the medium of the pivoted lever G and the links $g$ and $f$, and vice versa. The drawings show the upper slide closed and the lower slide open.

The actuating-valves may be mounted on the stand H, carried on the flooring J, the pipes K being led under the flooring or under the girder carrying the flooring, as shown, and up the sides of the buckstays L.

In order to operate the slides C and F, according as it is required to open or close the one or the other, the moving of the hand-lever N in the one direction causes the piston-rod $b$ to move out of the cylinder, so as to close the top slide, this movement simultaneously opening the lower slide F. On moving the lever in the opposite direction the piston-rod $b$ is drawn into the cylinder, so as to open the top slide and simultaneously close the bottom slide.

The elevation and plan of the hydraulic valve, Figs. 2 and 3, respectively, show an arrangement for actuating six cylinders. The numbers on the valves correspond with the particular hydraulic cylinders. The valves 1 1, Fig. 3, are the pressure-valve and the exhaust-valve, respectively, of No. 1 cylinder. The valves 2 2 are the pressure-valve and the exhaust-valve, respectively, of No. 2 cylinder. The valves 3 3 are the pressure-valve and the exhaust-valve, respectively, of No. 3 cylinder, and so on up to the valves 6 6.

To start the operation, a pair of screw-down valves—say Nos. 1 1—are opened. The main pressure screw-down valve M is opened from its seat at $m$, allowing the water-pressure from the pressure-pipe connection at $k^2$ to pass the said valve to the piston-valves $n^2 n^2$, the water-pressure passing through the passage $m'$, around the annular space $m^2$, through the small holes $m^3$, around the annular space $m^4$ of the piston-valve, then across the passage $m^5$ to the other piston-valve $n^2$, through the annular space $m^6$ and small holes $m^7$ around the annular space $m^8$ of this valve. By operating the lever N to, say, the right-hand side the piston-valve $n^2$ at that side is depressed until the plunger $n^3$ of the said valve passes the holes $m^9$, which allows the water to pass from the space $m^8$, through the said small holes $m^9$ and annular space $m^{10}$, to the passage indicated by the dotted circle $m^{11}$ to the near screw-down valve No. 1, which has previously been opened to allow the water-pressure to be led therefrom to the slide-cylinder. Simultaneously the exhaust from the other end of the slide-cylinder is allowed to pass through the open screw-down valve No. 1 and through the passage represented by the dotted circle $m^{12}$ of the other piston-valve to the annular space $m^{13}$, through the small holes $m^{14}$, down the passage $m^{15}$ to the exhaust $k^3$. By operating the lever N to, say, the left-hand side the action is reversed—that is to say, that what was the pressure piston-valve now becomes the exhaust piston-valve and what was the exhaust piston-valve now becomes the pressure piston-valve. The connection between the six screw-down pressure-valves and the main supply-valve which the lever N operates is through the branch pipes P P, and the connection between the six screw-down exhaust-valves and the exhaust-valve of the lever N is through the branch pipes Q Q. The pressure connection to the accumulator is shown at $k^2$ and the exhaust connection at $k^3$, Fig 2. The lever is keyed on the shaft $n$, which is formed with the cross rocking piece $n'$, the ends of which alternately raise and lower the valves $n^2$ for pressure and exhaust. The stop-valves 1 2 3 4 5 6 on either side are opened individually to permit connection with such of the hopper-slides C C as are to be worked. The cross-piece $n'$, keyed on the rock-shaft $n$, is connected at its ends to slide-valves of common form, (indicated at $n^2$ $n^2$,) so constructed that when the lever N is rocked to one side the branch pipes P and all the valves 1 2 3 4 5 6 on that side which may be open are connected with the pressure-pipe $k^2$, and the corresponding valves on the other side are connected through their branch pipes Q with the exhaust-pipe $k^3$, and vice versa when the lever is rocked to the other side. The arrangement is such that the one compound valve (being the valves $n^2$) can by means of the supplementary ports or valves 1 1 to 6 6 be made to actuate any corresponding number of cylinders.

Fig. 1ª shows a different method of supporting the cylinders—that is to say, that instead of the cylinders being carried by the girders A they may be carried by the hopper itself by attaching the cylinder thereto by means of the bracket $r$.

Fig. 1ᵇ shows another arrangement in which the cylinders may be carried by the measuring-chamber E by attachment thereto by the bracket $r'$.

I do not limit myself to the precise arrangement of the hydraulic cylinders or of the actuating-levers, because such may be modified to suit various purposes, and the same with regard to the valves and the connecting-pipes. Also in lieu of hydraulic power I may use steam or compressed air.

My improvements may be applied to all kinds of discharging-hoppers with or without a measuring-chamber. For example, the discharging-slide, such as C, Fig. 1, may be applied to the discharging-orifice of the hopper from which the coal is discharged directly into the chute below without the measuring-chamber E and lever G or in other cases discharging the coal into a traversing truck and then tipping the truck into the retort.

Figure 4:
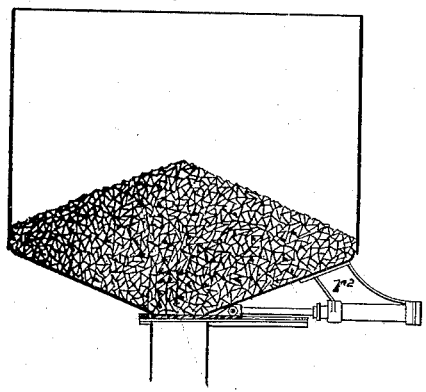
Figure 5:
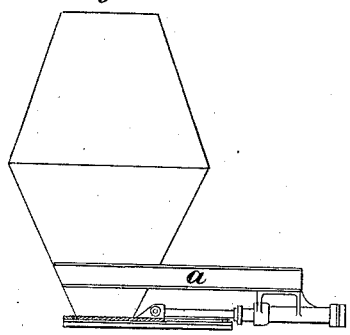
Figure 6:
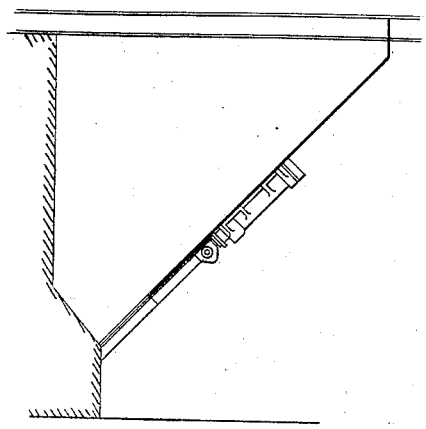
Figure 7:
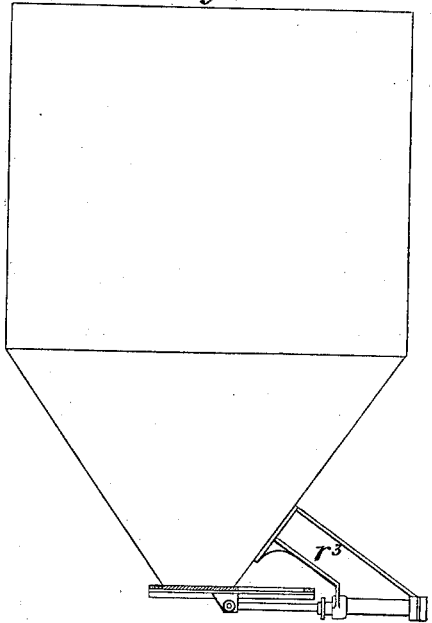

Fig. 4 shows the application of a cylinder and slide to the base of a coal or other bunker—such, for example, as might be used for discharging into a truck. In this case the cylinder may be supported from the bracket $r^2$, which is fixed to the under side of the hopper. Fig. 5 shows the application to another shape of bunker or hopper. With this shape of bunker or hopper the cylinder may be carried from a girder $a$. Fig. 6 shows the application of the cylinder to another kind of bunker or hopper in which the cylinder is attached directly to the side of the bunker; Fig. 7 the application of the cylinder to another kind of bunker or hopper in which the cylinder is supported by the bracket $r^3$, which is attached to the side of the bunker.

My improved slide is applicable for discharging or measuring all kinds of materials into all kinds of receptacles.

I claim—

1. The combination of the hoppers D, measuring-chambers E, coupled slides C and F hydraulic cylinders B having piston-rods $b$ connected with the respective slides C, suitable conducting-chutes beneath the measuring-chambers for conveying the charges of coal therefrom to the several retorts; actuating-valves 1, 2, 3, &c., and conducting-pipes L for supplying fluid under pressure to the cylinders B in succession, substantially as set forth.

2. The combination of the hoppers D, suspended measuring-chambers E, coupled slides C, F, hydraulic cylinder B having piston-rods $b$ connected with the slides C for operating them, pipes L conveying operating-pressure to the several cylinders B; valves 1, 2, 3, &c., controlling the supply of fluid under pressure through the pipes L to the several cylinders B, water-supply valve M and operating-lever N, substantially as and for the purposes set forth.

3. The combination of hoppers D, measuring-chambers E, coupled slides C and F, hydraulic cylinders B, piston-rods $b$ connected to the slides C, connecting-pipes L, pressure connection $k^2$, exhaust connection $k^3$, paired valves 1, 2, 3, 4, 5, 6, operating-lever N, rock-shaft $n$, arm $n'$ carried thereby and pressure and exhaust valves $n^2$ operated by said arm, substantially as set forth.

WALTER RALPH HERRING.

Witnesses:
JOHN DAVIE,
ALEXANDER MASTERTON.